United States Patent [19]

Graham et al.

[11] Patent Number: 4,527,627
[45] Date of Patent: Jul. 9, 1985

[54] METHOD OF ACIDIZING PROPPED FRACTURES

[75] Inventors: John W. Graham, Alvin; A. Richard Sinclair, Houston, both of Tex.

[73] Assignee: Santrol Products, Inc., Houston, Tex.

[21] Appl. No.: 518,158

[22] Filed: Jul. 28, 1983

[51] Int. Cl.$^3$ ...................... E21B 43/267; E21B 43/27
[52] U.S. Cl. ..................................... 166/280; 166/281
[58] Field of Search ............... 166/280, 281, 271, 307, 166/308

[56] References Cited

U.S. PATENT DOCUMENTS

| | | | |
|---|---|---|---|
| 2,596,843 | 5/1952 | Farris | 166/307 |
| 2,689,009 | 9/1954 | Brainerd, Jr. et al. | 166/307 X |
| 2,981,334 | 4/1961 | Powell, Jr. | |
| 2,986,538 | 5/1961 | Nesbitt et al. | 166/276 |
| 3,026,938 | 3/1962 | Huitt et al. | 166/280 |
| 3,209,826 | 10/1965 | Young | 166/280 |
| 3,285,340 | 11/1966 | Huitt et al. | 166/280 |
| 3,376,930 | 4/1968 | Kiel et al. | 166/280 |
| 3,452,818 | 7/1969 | Gidley et al. | 166/308 |
| 3,455,388 | 7/1969 | Huitt | 166/308 X |
| 3,481,401 | 12/1968 | Graham | 166/280 |
| 3,842,911 | 10/1974 | Knox et al. | 166/307 |
| 3,857,444 | 12/1974 | Copeland | 166/276 |
| 3,929,191 | 12/1975 | Graham et al. | 166/280 X |
| 3,998,271 | 12/1976 | Cooke, Jr. et al. | 166/280 |
| 4,068,718 | 1/1978 | Cooke, Jr. et al. | 166/280 |
| 4,237,975 | 12/1980 | Scherubel | 166/307 X |
| 4,245,702 | 1/1981 | Haafkens et al. | 166/280 X |
| 4,336,842 | 6/1982 | Graham et al. | 166/280 X |
| 4,443,347 | 4/1984 | Underdown et al. | 166/280 X |

OTHER PUBLICATIONS

Foundrez Technical Bulletin 96–880.
Monsanto Technical Bulletin No. 6070C, Butvar ® and Formvar ®, Properties and Uses.

*Primary Examiner*—George A. Suchfield
*Attorney, Agent, or Firm*—Arnold, White & Durkee

[57] ABSTRACT

A method of treating a subterranean formation comprising hydraulically fracturing the formation and filling the fractures with a self-consolidating proppant. The proppant is consolidated and the formation then acidized to produce channels of increased conductivity adjacent the consolidated proppant.

4 Claims, 2 Drawing Figures

METHOD OF ACIDIZING PROPPED FRACTURES

FIELD OF THE INVENTION

The present invention is directed to a process for treating a subterranean formation surrounding a wellbore. More particularly, the invention is directed to a method for creating channels of high fluid conductivity by hydraulically fracturing a formation, filling the fracture with a consolidated permeable proppant and acidizing the adjacent formation to form an irregular etched pattern in the formation adjacent to the fractures.

BACKGROUND OF THE INVENTION

Crude oil and natural gas are produced from porous and permeable subterranean formations. The porosity or void space of the formation is a measure of the ability of a formation to store oil or gas. Permeability is a measure of the fluid conductivity of the formation. Permeability is related to the ability of fluids to move through the pores of the formation and is a necessary and essential requirement for the production of reservoir fluids. Where the natural permeability of a formation is low or operations within a well have damaged the ability of the formation to transmit fluids, the productivity of the well will be reduced. Remedial operations are necessary to increase the permeability in such cases.

Acidizing and fracturing are commonly employed methods for increasing the permeability of the formation. Both are methods for artificially creating channels of high fluid conductivity within the formation. Acidizing is accomplished by contacting the formation with an acid which will chemically react with and dissolve the formation. Acidization is often employed in conjunction with hydraulic fracturing.

Hydraulic fracturing is accomplished by subjecting a formation to high pressure fluid which is pumped down the well and into contact with the formation. This high pressure fluid causes the formation to split along lines of weakness when the yield strength of the formation is exceeded. These fractures are zones of high fluid conductivity and greatly increase the productivity of the formation.

When the pressure of the injected fluid is reduced, the fractures will tend to close due to the unbalanced compressive forces which are exerted on the formation. To prevent closure of the factures, propping agents are commonly employed. These propping agents are generally sand, metallic shot, plastic particles, glass beads, ceramics such as sintered bauxite, or woody material such as walnut hull fragments and are normally injected with a fracturing fluid to hold a fracture in an open position when fracturing pressure is relieved.

U.S. Pat. No. 3,481,401 to Graham describes a method of acidizing a fracture propped with a deformable acid resistant particle. This method creates channels of high fluid conductivity between columns of the formation rock which were insulated from acid attack by the deformable acid resistant proppant. Other patents, for example, U.S. Pat. No. 3,929,191 to Graham et al. disclose methods of propping fractures with self-consolidating resin coated particles. These methods, although effective, do not result in the same degree of increased productivity of the well as does the method of the present invention.

SUMMARY OF THE INVENTION

Applicant's invention relates to a method of treating a subterranean formation in which the formation is first hydraulically fractured. The fractures thus created are filled with self-consolidating resin coated particles which are then cured to form a permeable consolidated proppant within the fracture. The formation is then acidized to increase the permeability of the formation within the region of the fractures.

DETAILED DESCRIPTION

Figure 1:
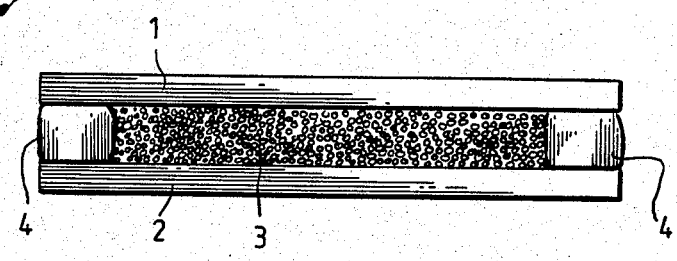
FIG. 1 is a cross-sectional view of a pair of carbonate slabs which have been joined together with a silicone rubber sealant leaving a void space between the two slabs. The void space has been filled with the self-consolidating permeable proppant of the present invention for experimental acidization evaluation.

The inventors have found that the productivity of oil and gas wells can be greatly increased through the use of their method. This method is equally applicable to any other applications involving the production or injection of a fluid into a borehole. The method is particularly effective in enhancing the productivity of carbonate formations. In general, the method involves creating fractures within the producing formation. These fractures are filled with self-consolidating resin coated particles which are then either thermally or chemically cured to form a cohesive proppant which is a permeable network having considerable compressive strength. After the proppant has cured, the formation is then acidized. The acid attacks those portions of the fracture walls not in contact with the cured proppant and forms an irregular etched pattern in the formation adjacent to the fracture. Where the proppant contacts the fracture face the acid solution cannot attack the formation and thus these portions of the formation remain in contact with the proppant and serve to hold the fracture open. This combination of maintaining original fracture width and increasing permeability of the formation lead to significantly higher productivity from the well. The invention is particularly suited to the treatment of carbonate formations.

DESCRIPTION OF PROPPANTS

The self-consolidating particles which are used as the fracture proppants are comprised of a particle substrate coated with a reactive resin. Typical examples of common particle substrates include sand, bauxite and glass beads. Resins which may be used include thermal setting phenolic resins of the resole type, phenolic novalac resins and epoxy resins. When resins such as the phenolic novalacs or epoxies are used it is required that a catalyst and/or cross-linker be provided to effect the curing of the resin.

Examples of the manufacture and use of such materials in the treatment of wells are shown in U.S. Pat. No. 3,857,444 to Copeland and U.S. Pat. No. 3,929,191 to Graham et al., both of which are hereby incorporated by reference.

The preferred self-consolidating proppant is that disclosed in applicants' co-pending applications Ser. Nos. 294 813, now abandoned and 437,431. A description of this preferred material follows.

The self-consolidating resin coated particles may utilize any suitable high strength, substrate as the particle centers. Choice of the particle substrate is governed by the properties required of the cured mass.

For example, in the oil and gas industry, extremely high strength proppants are needed to hold open formation fractures created by hydraulic fracturing. In such an application, the present invention may use spherical glass beads as the centers. Such beads are available commercially in a variety of mesh sizes. For example, Union Carbide Corporation supplies vitreous, rigid, inert, substantially spherical pellets under the trade name UCAR Props. Beads from about 6 to about 200 mesh are generally used. In extreme environments where stresses are very high, sintered bauxite, aluminum oxide, ceramics such as zirconium oxide and other mineral particles may be coated. Particles from 6 to 200 mesh are generally used. (All references to mesh size are to the U.S. Standard Sieve Series.)

In less severe conditions conventional frac sand is preferred for the centers of the invention. An advantage of the present invention is that, due to the increased strength obtained by the coating process, it allows the lower cost frac sand to be used under more severe conditions than possible with the materials of the prior art. Silica sand of about 6 to about 200 mesh is generally used.

The resins suitable for use in forming the coating include true thermosetting phenolic resins of the resole type and phenolic novolac resins which may be rendered heat reactive through the addition of catalysts and/or hardeners. The resins must form a solid non-tacky coating at ambient temperatures. This is required so that the coated particles remain free flowing and so that they do not agglomerate under normal storage conditions. Resins with softening points of 185°–240° F. (Ball and Ring Method) are acceptable.

Regardless of which type of resin is employed a coupling agent as subsequently described is preferably incorporated into the resin during its manufacture. The coupling agent, which has a functional group reactive in the phenol-formaldehyde system of the resin is added in an amount ranging from about 0.1 to 10 percent by weight of the resin. The preferred range is from about 0.1 to 3.0 percent by weight of the resin. The coupling agent is incorporated into the resin under the normal reaction conditions used for the formation of phenol-formaldehyde resins. The coupling agent is added to the resin reactants prior to the beginning of the phenol-formaldehyde reaction. This incorporation of the coupling agent in the resin is partly responsible for the increased resin-center bond strength provided by the invention.

The preferred resin to be used with the method of the present invention is a phenolic novolac resin. When such a resin is used it is necessary to add to the mixture a cross-linking agent to effect the subsequent curing of the resin. Hexamethylenetetramine is the preferred material for this function as it serves as both a catalyst and a source of formaldehyde.

It is also advantageous to add an organic acid salt such as calcium stearate to the resin-center mixture to act as a lubricant. Such an addition imparts a degree of water repellency to the finished product and aids in preventing sintering of the product during storage. The organic acid salt may be added to the resin or more conveniently may be simply added as a powder at the time the resin is added to the heated centers.

Problems associated with sintering of the product during storage can be further minimized by increasing the "stickpoint" of the resin. Raising of the stickpoint avoids problems of sintering and lumping of the resin coated particle when stored at high temperatures (100° F.–120° F.).

Stickpoint is measured by applying the resin coated particles to a square metal rod heated at one end. The rod has a uniform temperature gradation from its heated end to its unheated end. After one minute the particles are dusted from the rod. The temperature of the point along the rod at which the particles adhere to the rod is measured and is the stickpoint.

To increase the stickpoint a small amount of dry hexamethylenetetramine is added to the flake novolac resin before it is coated on the centers. The blending of the hexamethylenetetramine with the resin during the initial phase of the hot coating process allows for some polymerization of the resin to occur before cooling. This polymerization results in an increase in the resin stickpoint.

The amount of hexamethylenetetramine added in this manner is dependent upon the final stickpoint desired. Generally about 1 to about 10% dry hexamethylenetetramine based on the weight of the flake resin is added. For example the addition of 2.8% hexamethylenetetramine to the resin in the manner just described elevated the stickpoint of the finished product from 210° F. to 238° F. This increase in stickpoint is sufficient to remedy the storage problems of sintering and lumping.

Another problem encountered in the use of the product of the instant invention is the creation of dust during handling operations in the field. The resin coating on the particles is brittle and abrasive action between the particles during high velocity transport generates fine particles of free resin. This dust is objectionable to observe and its elimination is desirable.

The incorporation of a small amount of polyvinyl acetal resin into the resin coating has been found to increase the resin strength and thereby reduce its brittleness. This results in the virtual elimination of the dusting problem.

The preferred polyvinyl acetal for this application is polyvinyl butyral although other resins such as polyvinyl formals may be used.

Specifically a polyvinyl butyral, BUTVAR B-76, manufactured by Monsanto Co., has proven to be effective in strengthening the resin coating and eliminating the dust problem.

The coupling agent to be employed is chosen based on the resin to be used. For phenolic resins, the preferred coupling agents are organo functional silanes such as aminoalkylsilanes. Gamma-aminopropyltriethoxysilane has given excellent results when used with phenolic resins. Preferably the coupling agent is both incorporated into the resin structure and reacted with the center surface prior to the resin coating step. This unique dual treatment with the coupling agent results in a higher resin-center bond strength and the concomitant increase in the strength of the cured mass. The same coupling agent may be used in the resin and the center treatment or two different coupling agents may be employed. It is also possible to obtain some improvement in the strength of the cured mass by pretreating only the center surfaces or by only adding the coupling agent to the resin.

The centers to be coated are weighed and then transferred to a heated rotating drum. During the transfer, the centers are sprayed with a solution containing the coupling agent. A solution is used to insure adequate wetting of the center surface with the coupling agent. The preferred solvent is alcohol, although certain hazards exist. Water also makes an excellent treating solvent.

A sufficient quantity of water must be used to insure adequate dispersion of the coupling agent over the surface of the centers. It is also important not to use too much water as excessive time and heat are then needed to drive off the water during the evaporation step. The amount needed is of course dependent upon the size of the centers. For example for 20/40 mesh sand, it has been found that 0.5 to 5 gallon per 1000 lb of sand gives adequate coverage.

The concentration of coupling agent in the water depends on the surface area of the centers, the amount of water to be used and the nature of the coupling agent. The concentration is generally between 0.1% and 10.0% by volume. The preferred range is generally between 0.5% and 3.0%.

After the coupling agent sprayed centers have entered the heater drum, the mixture is agitated without heat for a period of time ranging from 5 seconds to 1 minute to insure proper dispersion of the coupling agent over the surface of the centers.

The heater is then fired and the centers are heated by a hot air blast to approximately 250°–350° F. During this heating period the water is evaporated and the coupling agent reacted with the surface of the centers. In addition, the hot air blast can be utilized to remove fines from the centers which can lower the permeability of the cured particle mass.

The heated centers are then discharged into a mixer. The flake resin into which a coupling agent has been incorporated is then added. The ratio of resin to the centers varies with the strength required and the size of the centers. Typically the resin coating constitutes between about 1 and about 8 percent by weight of the particles. Dry hexamethylenetetramine may also be added at this time to elevate the stickpoint as previously described.

A lubricant such as calcium stearate is added to the centers with the resin. The amount of lubricant is generally in the range of 0.1 to 10 percent based on the weight of the resin. The preferred amount is in the range of about 0.5 to 5.0 percent. Also a polyvinyl acetal may be added at this time to improve the resin strength and eliminate the creation of dust during handling.

The mixture of heated centers and resin is then agitated for a period of about 30 seconds to 5 minutes. This time must be sufficient to insure complete coverage of the centers.

An aqueous solution of hexamethylenetetramine is then added to the resin-center mixture. This solution serves as a vehicle for the addition of the hexamethylenetetramine and as a quench. The amount of hexamethylenetetramine is generally between about 10 and 20 percent based on the weight of the resin. The preferred range is between about 13 and about 17 percent. The amount of water should be sufficient to cool the mixture sufficiently to prevent reaction of the hexamethylenetetramine and to harden the resin. The amount of water needed ranges generally from about 1 to about 5 gallons per 1000 lb of particles. It is of course understood that if a resole type resin is used no hexamethylenetetramine is needed. In such a case the quench is still necessary to prevent further reaction of the resin and to begin the hardening process.

After the quench solution is added, the agitation of the mixture is continued and the coated particles are further cooled by blowing air through them.

The hardened particles are then discharged to conveyors which carry the coated particles to screening and bagging operations.

FRACTURING OPERATION

The first step of the method of the present invention is to hydraulically fracture the subterranean formation. In carrying out a hydraulic fracturing operation a fracture is first generated by injecting a viscous fluid into the formation at a sufficient rate and pressure to cause the formation to fail in tension. The carrier fluid having the self-consolidating proppants suspended therein is then pumped into the propagating fracture. The temperature of a carrier fluid during pumping operations will be low so as to prevent premature curing of the resin. The carrier fluid bleeds off into the formation and deposits the propping agent in the fractures. This process is controlled by fluid loss agents which are small aggregate particles which temporarily slow the fluid loss to the formation.

After the proppant is placed, the well is shut in with pressure maintained on the formation. As the pressure within the fracture approaches the normal formation pressure, the fracture walls close in on the proppant and apply an overburden stress thereto. At the same time ambient formation temperature heats the resin. Initially the resin fuses and unites at contact areas between contiguous particles or with the formation walls. As the temperature increases the polymerization reaction proceeds until the resin is cured into an insoluble and infusible cross-linked matrix. If a resin such as the epoxy resin described in Copeland is used, it will be necessary to add an appropriate catalyst to the carrier fluid to effect the cross-linking. The resin in the pendular regions between adjacent particles bonds the packed particles into a cohesive permeable matrix having considerable compressive strength.

ACIDIZING OPERATION

After the proppant has consolidated, an acidizing solution is displaced into the fracture system. Where the permeability of the formation is extremely low, displacement of the acidizing fluid into the formation may take an extended period of time. The acid can be injected at rates sufficient to reopen the fracture or merely displaced into the formation. In such instances, a relatively slower reacting organic acid or a mineral acid with a retarder might be used to insure the acidizing solution adequately penetrates the formation before it is spent.

After the acid has been displaced into the fracture system, the well is shut in and the acid allowed to remain in contact with the formation for a period of time ranging from several hours to a day or more. The pressure on the well is then reduced and the spent acid containing the salts formed by the reaction of the acid with the formation is permitted to flow back into the wellbore and is pumped to the surface. The well may than be placed on production.

The acid will attack the exposed faces of the fractures dissolving the formation and creating channels and voids extending away from the fracture. Where the formation is in contact with the consolidated proppant it is shielded from the acid and therefore the acid is unable to attack those portions of the formation. These areas of the fracture face are thus left intact by the acid treatment and are supported by the proppant to hold the fracture at its original width. In the area attacked by the acid, the fracture dimensions are enlarged through the dissolution of the formation. Thus channels of increased conductivity are produced.

The attack on the faces of the fractures in random places as dictated by the geometry of the consolidated proppant result in the development of an irregular etched pattern in the faces of the fractures, thereby increasing the permeability of the formation adjacent to the fractures.

These factors: maintaining the fracture at its original width, increasing the permeability of the formation adjacent to the fracture, and providing a stable permeable proppant combine to greatly increase the productivity of the treated formation.

LABORATORY EXPERIMENTS

Laboratory experiments were conducted to determine the effectiveness of acidizing a fracture containing the consolidated permeable proppants. Two slabs of Lueder's limestone measuring 4 inches wide by 6 inches long were glued together with a silicone rubber sealant along the longitudinal peripheries. A distance of ¼ inch separated the slabs into which was placed the self-consolidating proppants prepared according to the above description. The proppant was cured dry at 350° F. for 0.5 hours. A cross-sectional view of the slabs containing the cured proppant is seen in FIG. 1.

Figure 2:
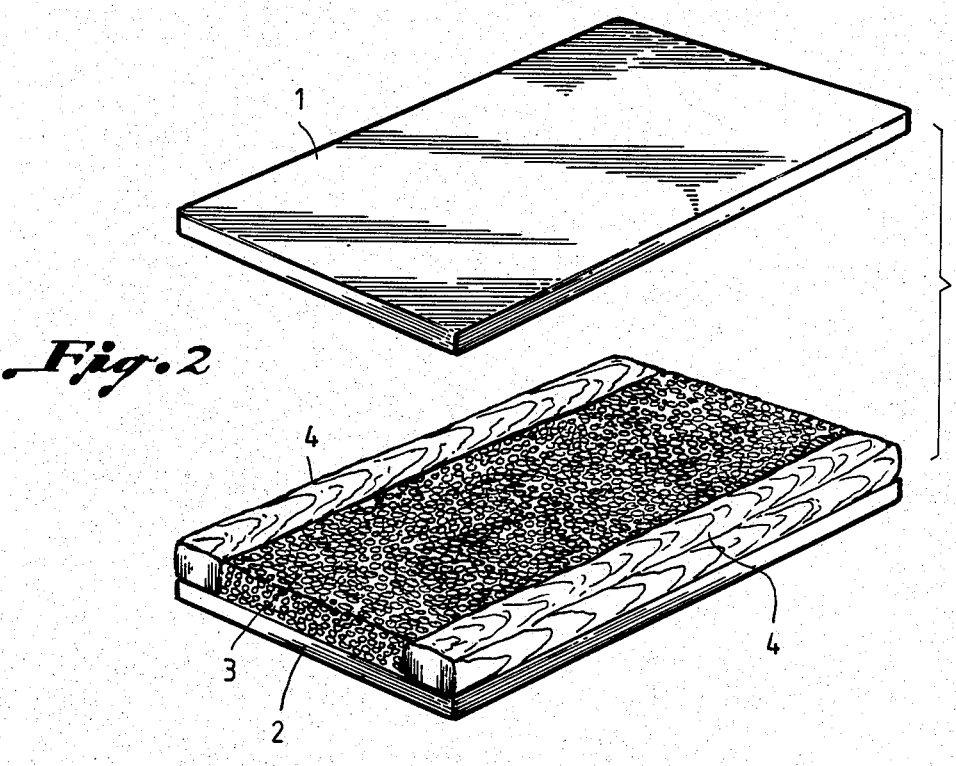
FIG. 2 shows the parallel slabs with the upper slab removed following acidization.

Acidization of the simulated fracture was performed by flowing 3000 milliliters of an aqueous solution containing 15% hydrochloric acid by weight through the consolidated proppant. A marked increase of the effective permeability of the simulated fracture was noticed immediately upon acidization. The proppant was rinsed with water to remove the acid and the upper slab removed as shown in FIG. 2 to observe the irregular etching pattern.

Further modifications and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. Applicants intend that all such modifications, alterations, and variations which fall within the spirit and scope of the appended claims be embraced thereby.

We claim:

1. A method for treating a subterranean formation comprising:

hydraulically fracturing said formation to create fractures therein;

filling said fractures with self-consolidating resin coated particles;

curing said resin coated particles to form a cohesive permeable matrix within said fractures; and acidizing said formation so as to produce channels of increased conductivity adjacent said matrix.

2. The method of claim 1, wherein said resin coated particles comprise:

high strength centers;

a coupling agent chemically bound to said centers;

a novalac resin coated over said centers and bound to said coupling agent; and a cross-linking agent.

3. The method of claim 2, wherein said formation is a carbonate formation.

4. A method for treating a subterranean carbonate formation comprising:

hydraulically fracturing said formation to create fractures therein;

filling said fractures with self-consolidating resin coated particles comprised of high strength centers, a coupling agent chemically bound to said centers, a novalac resin coated over said centers and chemically bound to the coupling agent, and a cross-linking agent;

curing said resin coated particles to form a cohesive permeable matrix within said fracture; and acidizing said formation so as to produce channels of increased conductivity adjacent said matrix.

* * * * *